F. N. SPELLER.
METHOD OF MAKING BUTT WELD PIPES.
APPLICATION FILED APR. 6, 1915.
1,149,697.
Patented Aug. 10, 1915.
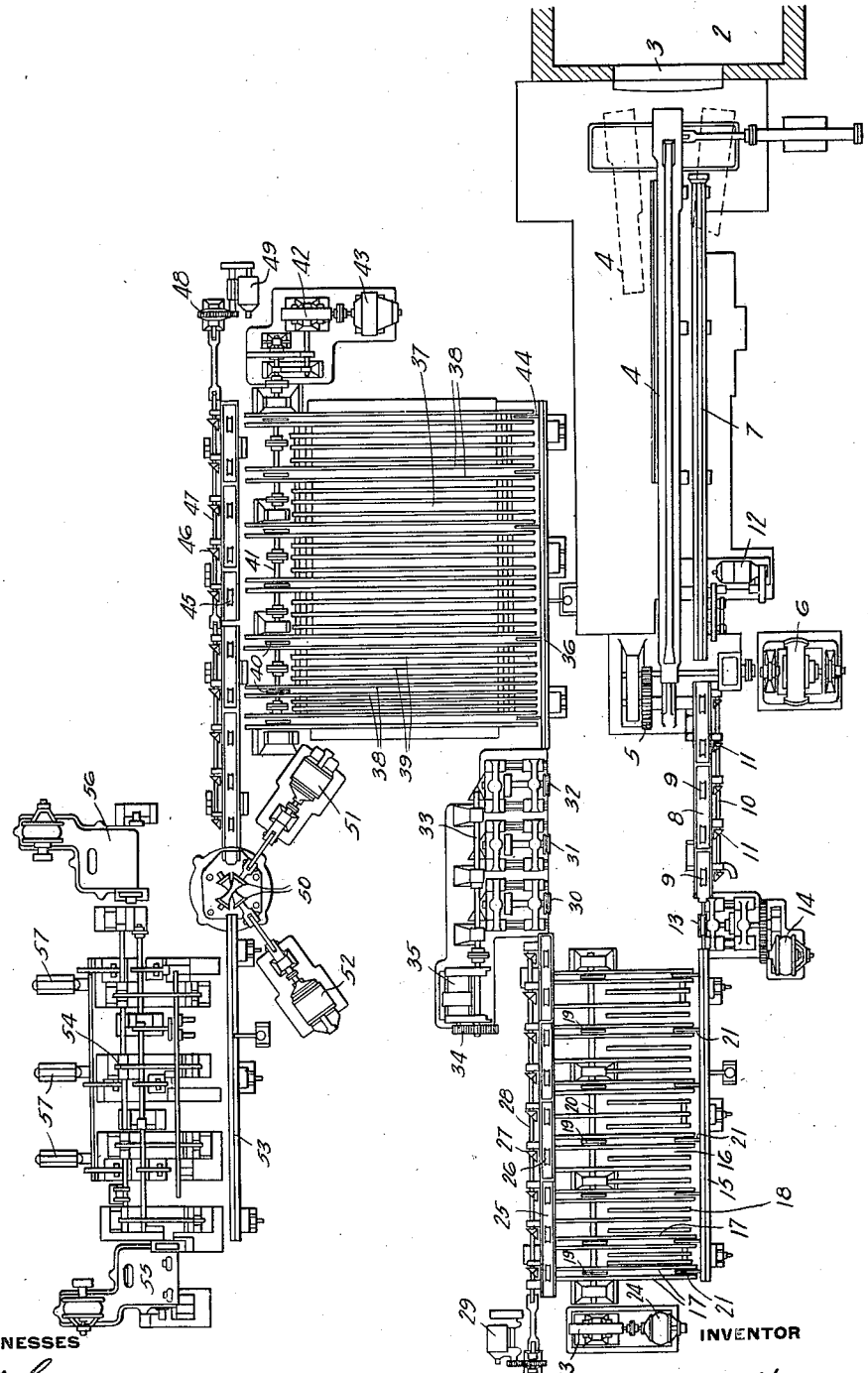
WITNESSES
INVENTOR
F. N. Speller
by C. C. Linthicum
his Attorney.

UNITED STATES PATENT OFFICE.

FRANK N. SPELLER, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

METHOD OF MAKING BUTT-WELD PIPES.

1,149,697.  Specification of Letters Patent.  Patented Aug. 10, 1915.

Application filed April 6, 1915. Serial No. 19,531.

*To all whom it may concern:*

Be it known that I, FRANK N. SPELLER, a citizen of the United States, and resident of Pittsburgh, in the county of Allegheny and State of Pennsylvania, have invented certain new and useful Improvements in Methods of Making Butt-Weld Pipes, of which the following is a specification.

My invention relates to the manufacture of the small sizes of wrought metal pipes made by the butt-weld process.

In the methods of making butt-weld pipe employed heretofore, the skelp after being heated to a welding temperature were drawn through a welding bell, and to equalize and fix the external diameter of the pipes were then immediately passed through a stand of sizing rolls. The sized pipes were then passed lengthwise between skew rolls to straighten the pipes, in cases where the skew straightening rolls are used, and after being cooled were cut to length and threaded. No attempt was made to remove the scale covering the inner and outer surfaces of the pipes in making butt-weld pipe, the result being that such pipes were invariably covered on both the inner and outer surfaces with a fused, tightly adherent, non-porous, enamel-like scale.

One object of my invention is to provide an improved method of making butt-weld pipe whereby the fused scale is entirely removed from the surfaces of the pipes.

Another object of my invention is to provide a novel method of making butt-weld pipe by which the surfaces of the pipes are covered with a thin film of substantially uniform thickness of unfused oxid, instead of the fused, enamel-like scale on the surfaces of the pipes as made heretofore.

A further object of this invention is to provide an improved method of making butt weld pipe in which the weld is strengthened and a materially stronger pipe is produced.

Still further objects of my invention will become apparent as the invention is more fully described hereinafter and specifically pointed out in the appended claims.

This invention is based upon the discovery that in the manufacture of butt-weld pipe the fused scale necessarily covering the surfaces of the welded pipes at the completion of the welding operation is effectively removed and is replaced by a thin coating of unfused oxid of substantially uniform thickness, by subjecting the welded pipes to the pressure of reducing rolls, while the pipes are still heated from the welding operation within a certain range in temperature, this range in temperature varying from that at which the fused scale sets and becomes brittle, (about 1100 degrees centigrade or a dull yellow or light orange color) to that at which the pipes can be reduced in cross section and elongated or increased in length, (a dull red heat) without splitting or endangering the weld. By regulating the temperature at which the scale is removed to within the limits described, the complete removal of the fused scale is insured, especially that upon the inner surfaces of the pipes, the loss by splitting and damaging the weld in attempting to remove the scale while the pipes are cold is avoided and prevented, and the surfaces of the pipes are coated with a thin film of unfused oxid of uniform thickness upon exposure to the atmosphere after the scale removing operation. This film of oxid is easily and quickly removed by pickling when the pipes are intended to be coated with another metal as in galvanizing or enameling.

The drawing forming part of this specification is a diagrammatic plan showing a preferred arrangement of apparatus adapted for use in making butt-weld pipe in accordance with my invention.

In the drawing, the numeral 2 designates the discharge end of a welding furnace having a discharge outlet or opening 3. Positioned in front of this discharge outlet is a draw bench 4 having an endless draw chain thereon which is driven through the reducing gearing 5 by the motor 6 in the usual known manner. The draw bench, which as shown is of the swinging type, has a trough 7 on one side into which the welded pipes are delivered sidewise from the draw bench 4, and the discharge end of this trough 7 is in line with the rollers 9 of the feed table 8. The rollers 9 of this feed table are driven by the line shaft 10 through bevel gearing 11 in the usual known manner, and the line shaft 10 is operatively connected to and driven by the motor 12.

At the end of the feed table is a stand of reducing rolls 13 which are preferably, although not necessarily used, in which the highly heated welded pipes are elongated and decreased in diameter, and the wall thickness or gage along the line of the weld is increased so as to materially increase the strength of the weld. The two-high stand of reducing rolls 13 is driven by means of the motor 14. On the discharge side of the rolls 13 is a trough 15 which receives the pipes as discharged from the reducing rolls 13. As the rolls will deliver the pipes into the trough 15, the positively driven feed rollers ordinarily used in troughs are not shown. The trough 15 extends lengthwise alongside a transfer table 16 across which the pipes are transferred while being cooled from the high temperature at which they are welded to a temperature below that at which the fused scale becomes set, this scale being formed in heating the skelp and always being present on the surfaces of the pipes at the completion of the welding operation. The scale on the outer surfaces, being exposed to the atmosphere, will cool more rapidly than that on the inner surfaces of the pipes, and the time necessary to cool the pipes to the temperature at which the scale sets on the interior of the pipes will vary with different sizes of pipes.

The transfer table 16 comprises a series of skids 17 and 18, the skids 17 forming supports for the series of sprocket chains on the transfer table. The sprocket chains have upwardly extending horns or arms at intervals in the length thereof and are secured on driving sprocket wheels 19 on the driving shaft 20. Idler sprocket wheels 21 on the idler shafts, which are on the opposite side of the transfer table 16, are employed to carry one end of the strands of chain.

The shaft 20 is driven through reducing gearing 23 by a motor 24, this shaft running at a speed which can be regulated to increase or lessen the time required to move a given pipe from the receiving side to the discharge side of the transfer table 16. Alongside the discharge side of this transfer table is a delivery table 25 which is provided with a series of rollers 26 driven through bevel gearing 27 and the line shaft 28 by the driving motor 29.

At the discharge end of the delivery table is a series of three stands of rolls 30, 31 and 32, each stand having a pair of two-high rolls mounted therein, the rolls being connected by suitable gearing to a driving shaft 33 which is connected through the reducing gearing 34 to the driving motor 35. When desired, but one roll of each pair may be positively driven, and in cases where the distance between the pairs of rolls is not too great, each alternate pair of rolls only may be driven. The pairs of rolls may have cylindrical or elliptical passes, or part cylindrical and part elliptical, as preferred. The stands of rolls 30, 31, 32, are in line with a receiving trough 36 which is positioned at one side of a cooling table 37. The cooling table 37 has a series of skids 38 and 39, the skids 38 forming supports for sprocket chains, by which the pipes are positively moved from the receiving side to the discharge side of the cooling table. The endless sprocket chains are mounted on driving sprocket wheels 40 on the line shaft 41, which is driven through suitable reducing gearing 42 by a motor 43, and idler sprocket wheels 44 for the sprocket chains are provided at the receiving side of the cooling table, the wheels 44 being mounted on shafts rotating in suitable bearings.

On the discharge side of the cooling table 37 is a roller feed table 45 the rollers of which are connected by bevel gears 46 with a line shaft 47 which is positively driven through reducing gearing 48 by a driving motor 49.

At the discharge end of the feed table 45, in the apparatus shown, is a pair of skew straightening rolls 50, each roll being driven by a motor 51, 52, in the usual known manner, these skew rolls generally, although not necessarily, being employed to straighten the pipes. The skew rolls 50 discharge the pipes into a trough 53 from which the pipes are delivered to the saw table 54. Saws 55 and 56 are provided, one at each end of this saw table, to cut the pipes to length, and the cut pipes are delivered and collected in quantities in the cradles 57 at the discharge side of the saw table 54. The cut pipes, after being collected in the cradles 57 are lifted therefrom in bulk by suitable overhead pipe handling mechanism and are delivered to the threading floor of the mill or other place of storage or use.

In carrying out my improved method the skelp are heated to a welding temperature in the welding furnace 2 and are successively attached to the draw chain on the draw bench 4 and pulled through the welding bell on the end of the draw bench so as to butt-weld the skelp into pipes. The pipes as welded are transferred sidewise from the bench 4 into the trough 7 and are successively delivered lengthwise in this trough to the feed table 8. This feed table carries the pipes lengthwise into the bite of the reducing rolls 13 in which they are reduced in diameter and made truly cylindrical, while still heated to a temperature but slightly below that at which the pipes are welded on the draw bench. The pipes are then delivered from the rolls 13 into the trough 15 from which they are transferred sidewise to the transfer table 16. The sprocket chains on the transfer table 16 are caused to travel at a sufficiently slow speed to enable the fused scale on the surface of the welded and rolled pipes to cool to a temperature at or preferably slightly below that at which the scale sets on the surface of the pipe. This temperature (about 1100 degrees centigrade), will change with variations in the composition of the fused scale and the time required to cool the pipes to such a point will vary with the size of the pipes made. In cooling the pipes care is taken that the scale is set on the inner surface, as it does not cool as rapidly as the outer surface, which is more effectively exposed to the cooling action of the atmosphere. When the pipes reach the discharge side of the cooling table 16 and are delivered to the delivery table 25 they are transferred lengthwise thereon into the continuous mill formed by the pairs of rolls 30, 31 and 32, and the pipes in passing between these pairs of rolls are distorted, either by reducing in diameter and elongating, or by altering the cross section, and then restoring the pipes to a truly cylindrical condition. In this operation, the scale being set is cracked off and removed from both the inside and outside surfaces of the pipes while the pipes are still heated to a considerable temperature. Owing to this highly heated state the weld is not endangered and splitting of the pipes is prevented and overcome. The pipes are delivered by the rolls 32 into the trough 36 from which they are transferred sidewise to the cooling table 37. As the pipes become further cooled in their passage across the cooling table 37 the metallic surfaces which are now exposed, the fused scale having been entirely removed by the rolls 30, 31 and 32, will oxidize and become covered with a thin film of oxid of uniform thickness by the combined action of the heat and air. The pipes upon reaching the discharge side of the cooling table 37 are cooled to the point where further oxidation will not occur and they are then transferred to the feed table 45 by which they are delivered lengthwise into the skew straightening rolls 50, when such rolls are employed. The straightened pipes are delivered to the trough 53 on the exit side of the straightening rolls and are then transferred sidewise from this trough to the saw table 54. In the passage of the pipes across the width of the saw table first one end and then the other of the pipes is brought into contact with the saws 55 or 56, and the pipes are thereby cut to length. The cut pipes are then delivered successively into the cradles 57 and when a sufficient quantity has accumulated in the cradles such quantity is removed by a suitable overhead pipe handling mechanism.

The use of my improved method results in a very superior product in that instead of the surfaces of the pipes being covered with a coating of variable thickness of fused strongly adherent scale which is very difficult if not impossible to entirely remove when the pipe is cold, even with pickling or the employment of a sand blast, the inner and outer surfaces of the pipes will be covered with a thin film of unfused oxid which is of uniform thickness and forms a protective coating for the pipes until further treated or put into use. The so-formed film of oxid is easily and quickly removed by pickling, without liability of over-pickling or burning the pipes by prolonged pickling.

By rolling the welded pipes immediately after the welding operation, while the pipes are at a high temperature, the wall of the pipes is upset at the weld so as to increase the wall thickness or gage of the pipes at the weld, and in this way greatly increase the strength of the weld.

The rolling step of my improved method, by which step the pipes are reduced in diameter and elongated, may in some cases be omitted. The straightening rolls need not be employed, and other changes may be made without departing from my invention as defined in the appended claims.

I claim :—

1. The method of making butt-weld pipes which consists in welding the heated pipe skelp, cooling the welded highly heated pipes to a temperature between that at which the fused scale sets and that at which the exposed metallic surfaces of the pipes will oxidize, and then subjecting the pipes to rolling pressure to remove the fused scale and expose the metallic surfaces of the still heated pipes to the oxidizing influence of the atmosphere.

2. The method of making butt weld pipes which consists in welding the heated pipe skelp, cooling the highly heated pipes to reduce the temperature of the inner surface thereof to between that at which the fused scale sets and that at which the exposed metallic surfaces of the pipes will oxidize, and then subjecting the pipes to rolling pressure to remove the fused scale and expose the metallic surfaces of the still heated pipes to the oxidizing influence of the atmosphere.

3. The method of making butt-weld pipes which consists in welding the heated pipe skelp, subjecting the highly heated pipes to rolling pressure to thereby reduce the pipes in diameter and increase their wall thickness and gage at the weld, cooling the welded highly heated pipes to a temperature between that at which the fused scale sets and that at which the exposed metallic surfaces of the pipes will oxidize, and then subjecting the pipes to rolling pressure to remove the fused scale and expose the metallic surfaces of the still heated pipes to the oxidizing influence of the atmosphere.

4. The method of making butt-weld pipes which consists in welding the heated pipe skelp, cooling the welded highly heated pipes to a temperature below that at which the fused scale sets, and then subjecting the still heated pipes to rolling pressure to remove the fused scale.

5. The method of making butt-weld pipes which consists in welding the heated pipe skelp, subjecting the highly heated pipes to rolling pressure to thereby reduce the pipes in diameter and increase their wall thickness and gage at the weld, cooling the welded highly heated pipes to a temperature below that at which the fused scale sets, and then subjecting the still heated pipes to rolling pressure to remove the fused scale.

In testimony whereof, I have hereunto set my hand.

FRANK N. SPELLER.

Witnesses:
 IVAN B. McCORKLE,
 JOS. A. GUTHRIE.